(12) United States Patent
Toko et al.

(10) Patent No.: US 12,554,164 B2
(45) Date of Patent: Feb. 17, 2026

(54) MANUFACTURING METHOD OF LIQUID CRYSTAL ELEMENT, LIQUID CRYSTAL ELEMENT, LIGHTING APPARATUS, AND VEHICLE LAMP SYSTEM

(71) Applicant: STANLEY ELECTRIC CO., LTD., Tokyo (JP)

(72) Inventors: Yasuo Toko, Tokyo (JP); Satomi Suzuki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/663,297

(22) Filed: May 14, 2024

(65) Prior Publication Data

US 2024/0385482 A1 Nov. 21, 2024

(30) Foreign Application Priority Data

May 15, 2023 (JP) .................................. 2023-080006

(51) Int. Cl.
| | |
|---|---|
| *G02F 1/1337* | (2006.01) |
| *B60Q 1/14* | (2006.01) |
| *F21V 9/14* | (2006.01) |
| *F21W 102/165* | (2018.01) |
| *G02F 1/1339* | (2006.01) |

(52) U.S. Cl.
CPC .......... *G02F 1/133711* (2013.01); *B60Q 1/14* (2013.01); *F21V 9/14* (2013.01); *G02F 1/133788* (2013.01); *G02F 1/1339* (2013.01); *B60Q 2300/45* (2013.01); *F21W 2102/165* (2018.01)

(58) Field of Classification Search
CPC ......... G02F 1/133711; G02F 1/133719; G02F 1/133726; G02F 1/133753; G02F 1/133757; G02F 1/133788; B60Q 1/14; B60Q 2300/45; F21V 9/14; F21W 2102/165; F21S 41/645

See application file for complete search history.

(56) References Cited

U.S. PATENT DOCUMENTS

| | | | |
|---|---|---|---|
| 2011/0128487 A1* | 6/2011 | Kim ................... | G02F 1/133788 445/24 |
| 2014/0098313 A1* | 4/2014 | Jang ..................... | H10H 20/062 438/30 |
| 2019/0078749 A1* | 3/2019 | Toko ..................... | F21S 41/645 |

FOREIGN PATENT DOCUMENTS

JP S63106624 A 5/1988

* cited by examiner

*Primary Examiner* — Angela M. Medich
(74) *Attorney, Agent, or Firm* — Holtz, Holtz & Volek PC (57) ABSTRACT

A liquid crystal element is obtained having a plurality of alignment domains with a simple configuration. A manufacturing method of the liquid crystal element includes first through fourth processes. In the first process, a first substrate is formed having a first alignment film subjected to uniaxial alignment treatment. In the second process, forms a second substrate is formed having a second alignment film subjected to uniaxial alignment treatment. In the third process, a liquid crystal layer is formed between the first alignment film and the second alignment film using a liquid crystal material including a monomer which can be polymerized by light irradiation. In the fourth process, light is irradiated on, from among a first region and a second region adjacent to each other in the liquid crystal layer in a plan view, the first region with no voltage applied or with a voltage less than a threshold value applied to the first region.

17 Claims, 10 Drawing Sheets

MANUFACTURING METHOD OF LIQUID CRYSTAL ELEMENT, LIQUID CRYSTAL ELEMENT, LIGHTING APPARATUS, AND VEHICLE LAMP SYSTEM

BACKGROUND

Technical Field

The present disclosure relates to a manufacturing method of a liquid crystal element, a liquid crystal element, a lighting apparatus, and a vehicle lamp system.

Description of the Background Art

As one method for improving the viewing angle dependency of a liquid crystal element, a method using a plurality of alignment domains having different viewing angle characteristics is known (For example, refer to Japanese Unexamined Patent Application Publication No. Sho63-106624). According to this method, it is possible to change the viewing direction by each domain, and the viewing angle dependency of the liquid crystal element as a whole is improved.

However, there is room for improvement in that forming a plurality of alignment domains generally tends to complicate the manufacturing process.

In a specific aspect, it is an object of the present disclosure to provide a liquid crystal element or the like having a plurality of alignment domains with a simple configuration.

SUMMARY (1) A manufacturing method of a liquid crystal element according to one aspect of the present disclosure is a manufacturing method of a liquid crystal element including:
  (a) a first process that forms a first substrate having a first alignment film subjected to uniaxial alignment treatment;
  (b) a second process that forms a second substrate having a second alignment film subjected to uniaxial alignment treatment;
  (c) a third process that forms a liquid crystal layer between the first alignment film and the second alignment film using a liquid crystal material including a monomer which can be polymerized by light irradiation; and
  (d) of a first region and a second region adjacent to each other in the liquid crystal layer in a plan view, a fourth process that performs light irradiation with no voltage applied or with a voltage less than a threshold value applied to the first region.

(2) A liquid crystal element according to one aspect of the present disclosure is a liquid crystal element manufactured by the manufacturing method according to the above-described (1).

(3) A lighting apparatus according to one aspect of the present disclosure is a lighting apparatus including: (a) a liquid crystal element according to the above-described (2); (b) a light source; (c) an optical member that condenses a light emitted from the light source and causes the light to enter the liquid crystal element; and (d) a pair of polarizers arranged opposite to each other with the liquid crystal element in between.

(4) A vehicle lamp system according to one aspect of the present disclosure is a vehicle lamp system configured to include the lighting apparatus according to the above-described (3).

According to the above configurations, it is possible to provide a liquid crystal element having a plurality of alignment domains a s with simple configuration and a manufacturing method thereof, and a lighting apparatus and a vehicle lamp system including the liquid crystal element.

DESCRIPTION OF THE PREFERRED EMBODIMENTS

Figure 1A:
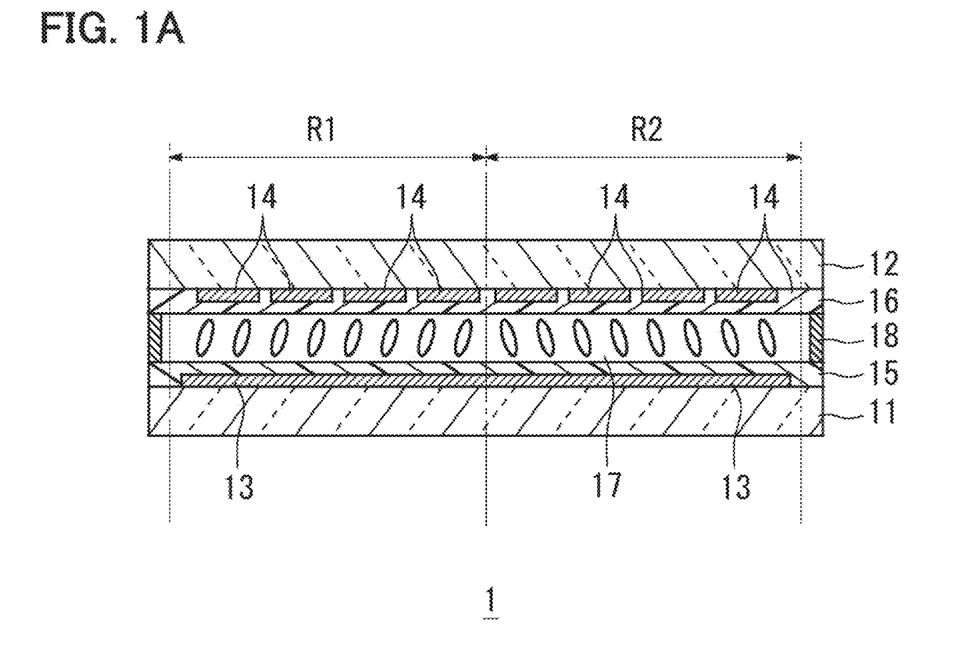
FIG. 1A is a schematic cross-sectional view showing the configuration of a liquid crystal element of one embodiment.
Figure 1B:
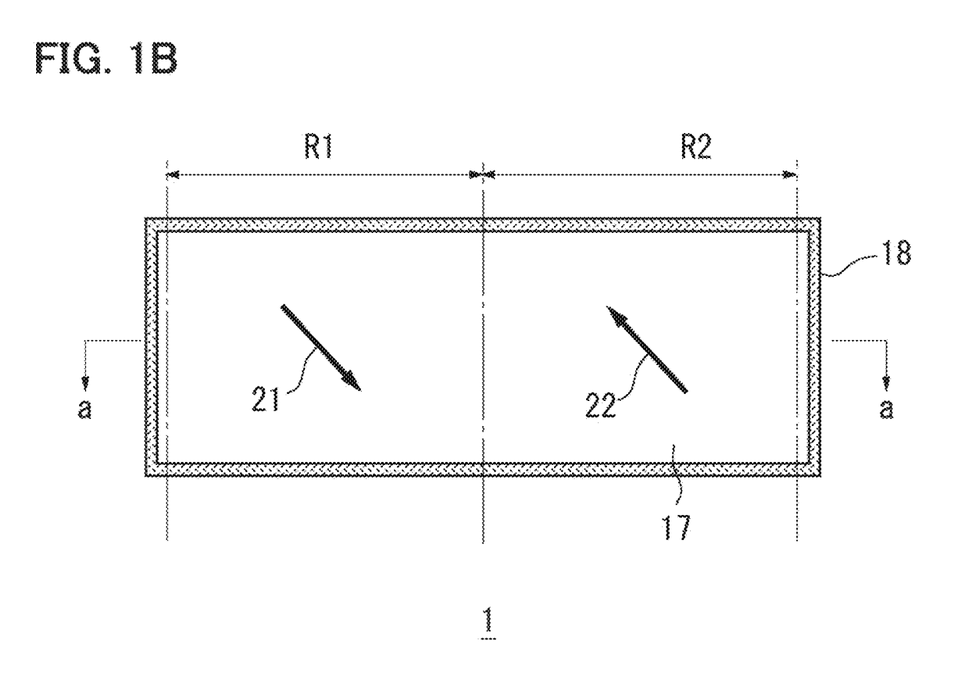
FIG. 1B is a schematic plan view showing the configuration of a liquid crystal element.

FIG. 1A is a schematic cross-sectional view showing the configuration of a liquid crystal element of one embodiment. Further, FIG. 1B is a schematic plan view showing the configuration of the liquid crystal element. The cross-sectional view shown in FIG. 1A corresponds to the cross-section taken along the a-a line shown in FIG. 1B. The liquid crystal element 1 shown in each figure is configured to include a first substrate 11 and a second substrate 12 arranged to face each other, a common electrode (counter electrodes) 13, a plurality of pixel electrodes 14, alignment films 15 and 16, a liquid crystal layer 17, and a seal material 18.

The first substrate 11 and the second substrate 12 are each rectangular substrates in a plan view for example, and are arranged to face each other. As each substrate, a transparent substrate such as a glass substrate or a plastic substrate can be used. Between the first substrate 11 and the second substrate 12, spherical spacers (not shown) made of resin film are distributed, and these spherical spacers maintain a gap between the substrates at a desired size (for example, in the order of several μm). Here, note that instead of the spherical spacers, a plurality of columnar bodies made of resin or the like may be provided on the first substrate 11 side or the second substrate 12 side, and these may be used as spacers.

The common electrode 13 is provided on one side of the first substrate 11 that faces the second substrate 12. The common electrode 13 is formed by appropriately patterning a transparent conductive film such as indium tin oxide (ITO). In this embodiment, one common electrode 13 is provided which is arranged across region R1 and region R2, but a common electrode may be provided for each region.

Each pixel electrode 14 is provided on one side of the second substrate 12 that faces the first substrate 11. Each pixel electrode 14 is formed by appropriately patterning a transparent conductive film such as indium tin oxide (ITO). A pixel portion is formed in each opposing portion of each pixel electrode 14 and the common electrode 13.

The alignment film (first alignment film) 15 is provided on one surface side of the first substrate 11 so as to cover the common electrode 13. Similarly, the alignment film (second alignment film) 16 is provided on one side of the second substrate 12 so as to cover each pixel electrode 14. As each of the alignment films 15 and 16, a vertical alignment film which regulates the alignment state of the liquid crystal layer 17 to a substantially vertical alignment is used, for example. Each of the alignment films 15 and 16 is subjected to a uniaxial alignment process such as a rubbing process, and has an alignment regulating force in one direction that defines the alignment of liquid crystal molecules in the liquid crystal layer 17. The directions of the alignment treatment on each of the alignment films 15 and 16 are set to be alternate (anti-parallel), for example. Although there is no particular limitation regarding the material of each of the alignment films 15 and 16, it is preferable to use an inorganic alignment film such as a siloxane-based vertical alignment film. Depending on the material and rubbing conditions, it is desirable that each of the alignment films 15 and 16 exhibits a pretilt angle of 89.4° or more with respect to the liquid crystal molecules of the liquid crystal layer 17 before an ultraviolet ray irradiation treatment which will be described later.

The liquid crystal layer 17 is provided between the first substrate 11 and the second substrate 12. In this embodiment, the liquid crystal layer 17 is formed by using a nematic liquid crystal material having fluidity, further having negative dielectric anisotropy $\Delta\varepsilon$ and including chiral material. In the liquid crystal layer 17 of this embodiment, alignment direction of liquid crystal molecules is tilted in one direction when no voltage is applied, and has a pretilt angle within a range of less than 90 degrees and close to 90 degrees with respect to each substrate surface, the alignment direction being set to be approximately vertical.

The seal material 18 is to seal the liquid crystal layer 17 and is provided between the first substrate 11 and the second substrate 12 so as to surround the liquid crystal layer 17. As shown in FIG. 1B, the seal material 18 is provided in an annular shape between the first substrate 11 and the second substrate 12. In this embodiment, since it is assumed that the liquid crystal layer 17 is formed by a one drop filling (ODF) method, the seal material 18 is not provided with an injection port. Here, note that when the liquid crystal layer 17 is formed by a vacuum injection method, an injection port (opening) is appropriately provided in a part of the seal material 18, and the injection port is sealed with an end seal material.

Here, the liquid crystal element 1 of this embodiment has two regions R1 and R2 within an effective region which is the inner side surrounded by the seal material 18. As shown in FIG. 1B, region R1 is the region on the left side in the figure, and region R2 is the region on the right side in the figure. In this embodiment, in each of regions R1 and R2, the pretilt angles of the liquid crystal layer 17 are different. Specifically, in FIG. 1A, when a pretilt angle is defined clockwise in the figure with the surface of the first substrate 11 facing the liquid crystal layer 17 as a reference (0°), the pretilt angle of region R1 is a value greater than 90° and close to 90° (for example, 90.5°), and the pretilt angle of region R2 is a value smaller than 90° and close to 90° (for example, 89.5°). That is, the alignment domain of the liquid crystal layer 17 is different between region R1 and region R2.

Figure 2A:
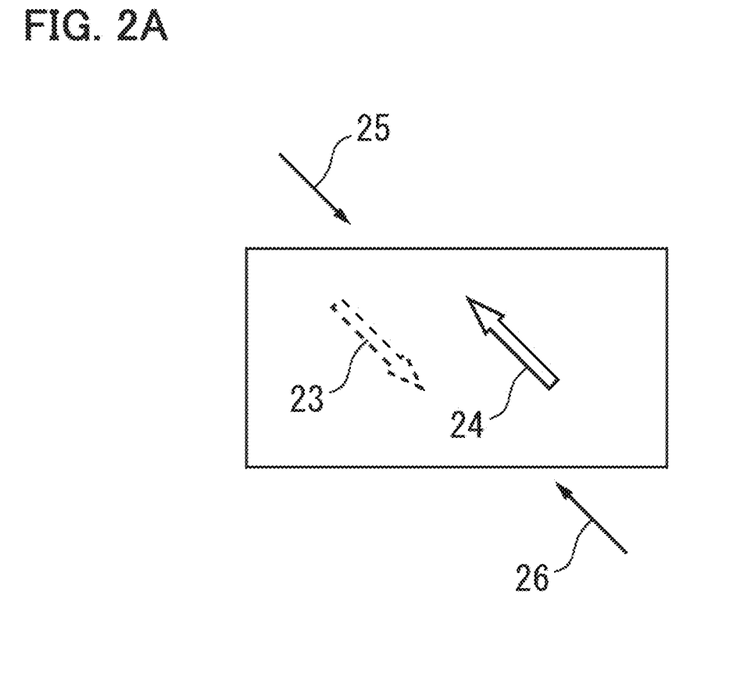
FIG. 2A is a schematic plan view of the liquid crystal element viewed from the second substrate side.

Further, in this embodiment, viewing direction 21 in region R1 and viewing direction 22 in region R2 are opposite to each other. In the illustrated example, the viewing direction 21 of region R1 is toward the lower right in the figure, and the viewing direction 22 of region R2 is toward the upper left in the figure. Here, "viewing direction" in this embodiment will be described. As in FIG. 2A which schematically shows a plan view of the liquid crystal element 1 viewed from the second substrate 12 side, in a case where alignment treatment direction 23 of the alignment film 15 of the first substrate 11 and alignment treatment direction 24 of the alignment film 16 of the second substrate 12 are antiparallel alignment, a direction 25 which substantially coincides with the alignment treatment direction 23 is defined as "viewing direction". Further, a direction 26 which is opposite to the direction 25 is defined as "reverse viewing direction".

Figure 2B:
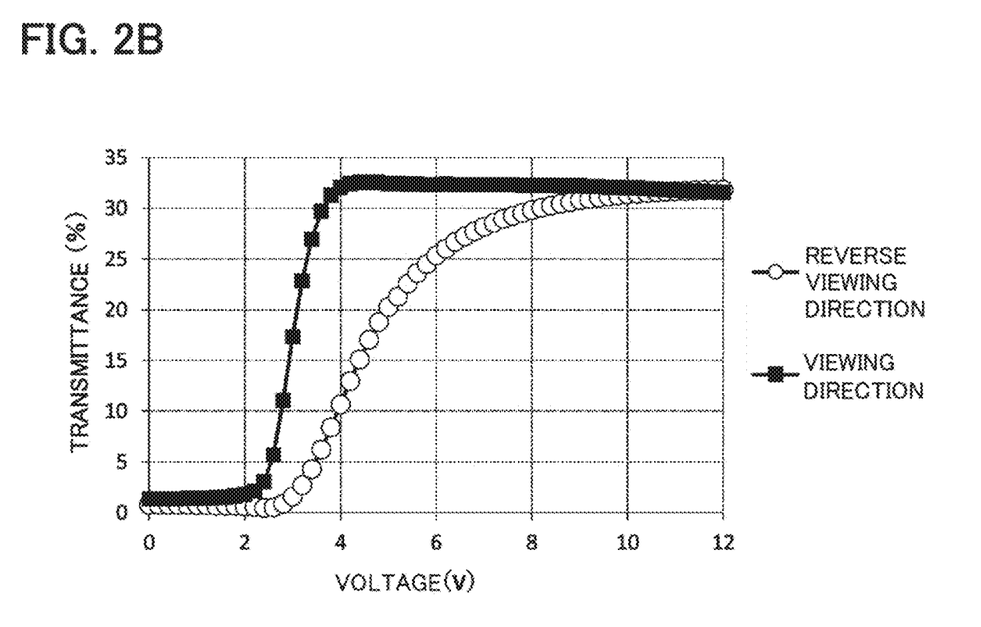
FIG. 2B is a graph illustrating electro-optical characteristics of a vertically aligned liquid crystal element measured in directions of +20° with respect to the polar angle direction as the viewing direction and the reverse viewing direction.

FIG. 2B illustrates electro-optical characteristics of a vertically aligned liquid crystal element measured in directions of +20° with respect to polar angle direction as the viewing direction and the reverse viewing direction. As exemplified in the figure, there is generally a difference in transmittance between the viewing direction and the reverse viewing direction, and this tendency is particularly noticeable in so-called halftone voltage range. For example, looking at transmittance when voltage of 4V is applied, the transmittance is about 32% in the viewing direction, while it is about 10% in the reverse viewing direction. That is, in other words, in the liquid crystal element, transmittance characteristics is different depending on whether light is incident from the viewing direction or a direction close thereto or whether light is incident from the reverse viewing direction or a direction close thereto.

An example of a manufacturing method for obtaining the above-described liquid crystal element 1 in which the pretilt angles are different in region R1 and region R2 and the viewing direction (as well as the reverse viewing direction) is also different accordingly will be described with reference to FIGS. 3A to 3E and FIGS. 4A to 4D.

Figure 3A:
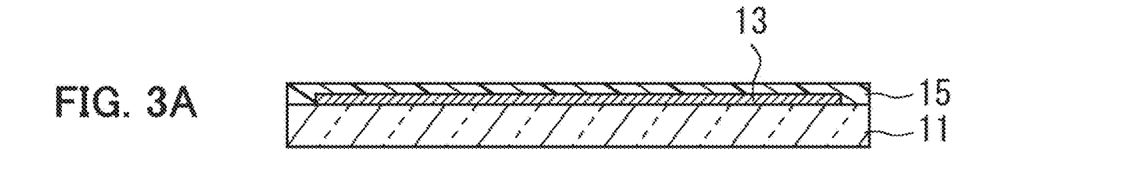
FIGS. 3A to 3E are diagrams for explaining an example of a manufacturing method for obtaining a liquid crystal element.
Figure 3B:
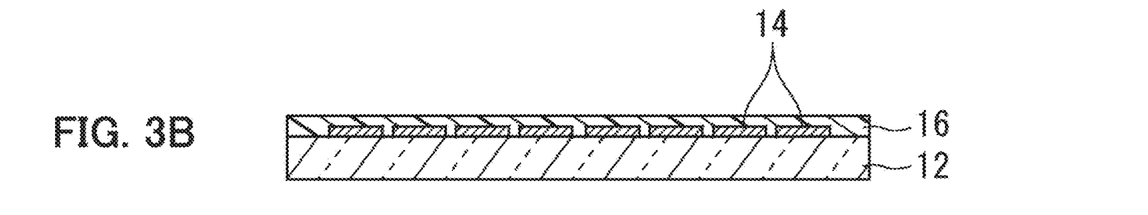

As shown in FIG. 3A, a transparent substrate as the first substrate 11 is prepared, a common electrode 13 is formed on one surface (opposing surface) thereof, and an alignment film 15 is further formed. Further, as shown in FIG. 3B, a transparent substrate is prepared as the second substrate 12, each pixel electrode 14 is formed on one surface (opposing surface) thereof, and an alignment film 16 is further formed. Note that TFTs and color filters may be formed on each substrate.

Here, as each of the alignment films 15 and 16, vertical alignment films are formed by flexographic printing but they may also be formed by inkjet or the like. After the alignment films are formed, heat treatment is performed at a predetermined temperature, and rubbing treatment is further performed as a uniaxial alignment process. There are no particular limitations on the heat treatment conditions and rubbing conditions, and known conditions can be selected as appropriate. As a result, a first substrate 11 having an alignment film 15 subjected to a uniaxial alignment process and a second substrate 12 having an alignment film 16 also subjected to a uniaxial alignment process are formed.

Figure 3C:
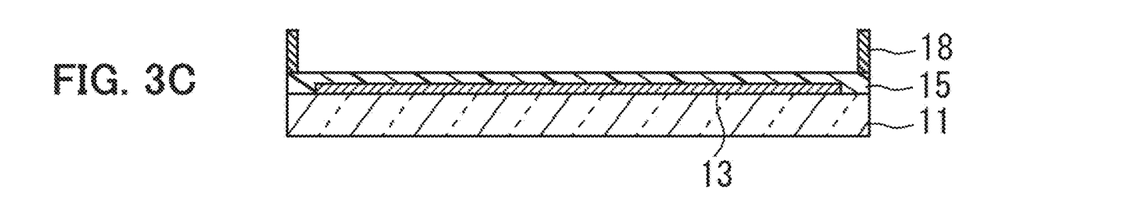

Next, as shown in FIG. 3C, a seal material 18 is printed on one surface of one of the substrates (here, the first substrate 11), and a gap control agent is sprayed. Here, note that resin spacers may be used instead of the gap control agent.

Figure 3D:
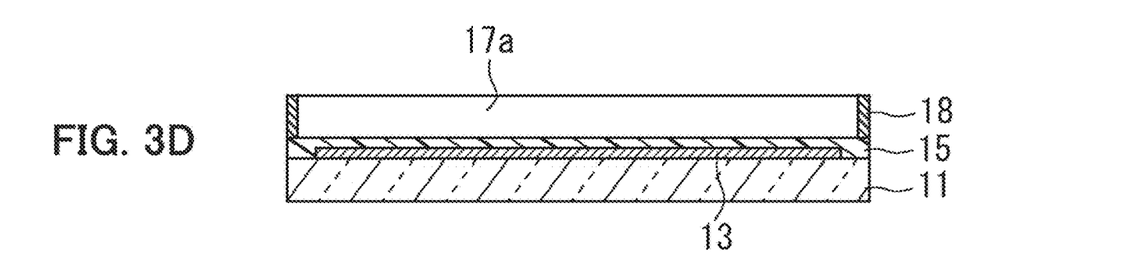

Next, as shown in FIG. 3D, liquid crystal material 17a is dropped inside of the seal material 18 using the one drop fill (ODF) method. Here, as the liquid crystal material used in this embodiment, a liquid crystal material with negative dielectric anisotropy, to which 0.3 wt % or more of Reactive Mesogen agent (hereinafter referred to as RM agent) is added, is used. The concentration of the RM agent is preferably 0.3 wt % or more in order to obtain a stable pretilt angle. The tendency to be able to obtain a stable pretilt angle at 0.3 wt % or more can be confirmed with various RM agent, and by setting the concentration of a specific RM agent at 0.3 wt % or more, a pretilt angle being tilted more than 89.7° was stably obtained.

Figure 3E:
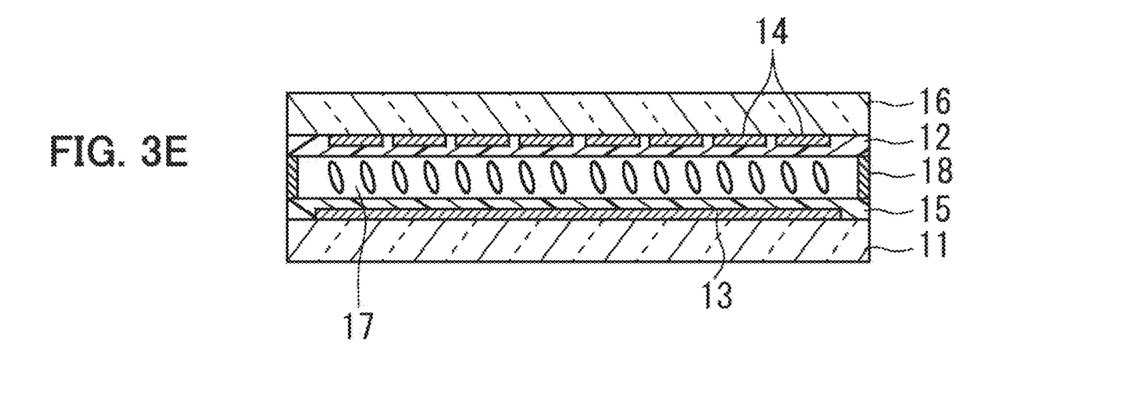

Thereafter, as shown in FIG. 3E, the first substrate 11 and the second substrate 12 are overlapped, and baking (press baking) is performed on the seal material 18. Thereby, a liquid crystal layer 17 is formed between the alignment film 15 of the first substrate 11 and the alignment film 16 of the second substrate 12. Here, the liquid crystal layer 17 is uniformly aligned under the alignment regulating force of each of the alignment films 15 and 16.

Here, note that as the method of forming the liquid crystal layer 17, a vacuum injection method may be used instead of the above-described ODF method. However, it is preferable to use the ODF method since the concentration distribution of the RM agent in the liquid crystal layer 17 becomes more uniform. When using the vacuum injection method, an injection port is provided in a part of the seal material 18, and after the first substrate 11 and the second substrate 12 are overlapped, the liquid crystal material 17a is injected using the injection port. Thereafter, the injection port is sealed with an end seal material.

Figure 4A:
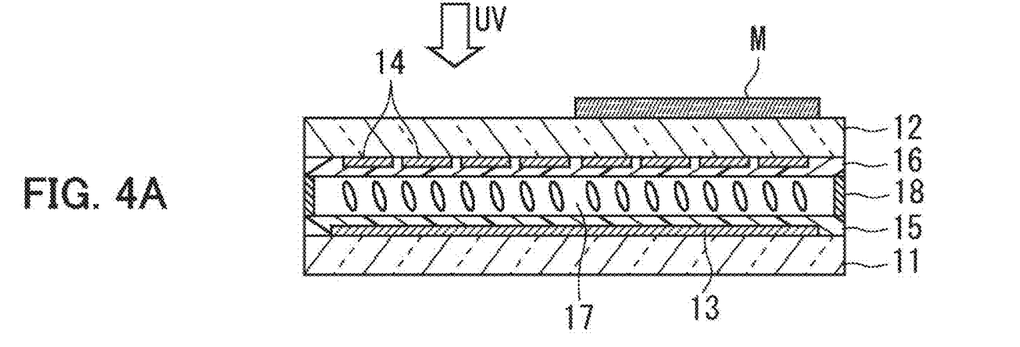
FIGS. 4A to 4D are diagrams for explaining an example of a manufacturing method for obtaining a liquid crystal element.

Next, as shown in FIG. 4A, a mask M that blocks light of a region corresponding to region R2 is placed on the first substrate 11 side (or second substrate 12 side), and from the side where this mask M is placed, the liquid crystal layer 17 is irradiated with ultraviolet rays. That is, region R1 is selectively irradiated with ultraviolet rays. At this time, no voltage is applied to the liquid crystal layer 17, or even if a voltage is applied, the voltage is less than a threshold value. Further, the direction of irradiation of the ultraviolet rays does not matter. For example, there is no particular need to take measures such as irradiating from an oblique direction, and there is no need to use parallel light. Here, note that when an ultraviolet curing sealant is used as the seal material 18, this process may also serve as curing of the seal material 18.

Figure 4B:
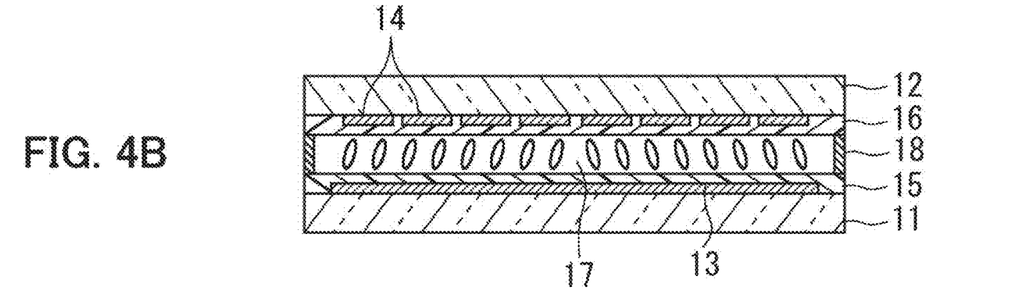

As described above, when the liquid crystal layer 17 is irradiated with ultraviolet rays, by applying no voltage to the liquid crystal layer or applying a voltage lower than a threshold value, as shown in FIG. 4B, the liquid crystal molecules of the liquid crystal layer 17 in region R1 have a pretilt in the direction opposite to the alignment regulating force of the alignment film. That is, region R1 and region R2 are each uniformly aligned but have different alignment directions. In other words, a liquid crystal element 1 with two-domain alignment is obtained. Here, note that if a voltage equal to or greater than the threshold value is applied during ultraviolet ray irradiation, the liquid crystal molecules cannot be reversed so as to have a pretilt in the direction opposite to the alignment regulating force of the alignment film.

The pretilt angle in region R1 has little dependence on the rubbing strength applied to the alignment film, and is, for example, about 90.2° to 90.3°. The pretilt angle in region R2 does have dependence on the rubbing strength applied to the alignment film, and is, for example, about 88.6° to 89.7°.

Figure 4C:
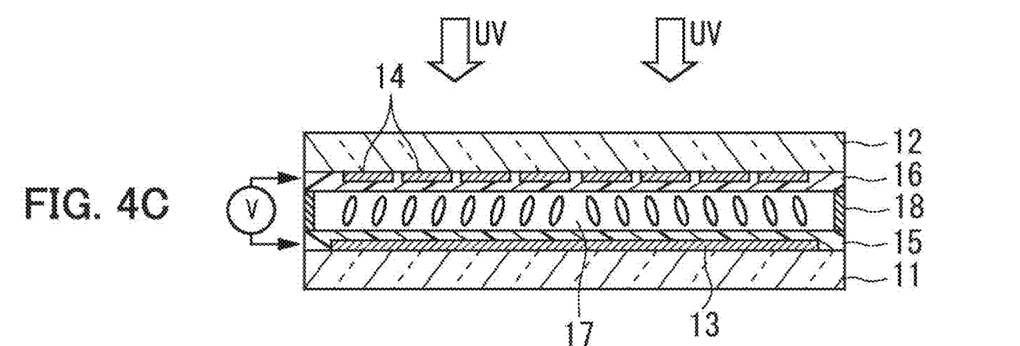

Further, after a first ultraviolet ray irradiation is performed with no voltage applied to the liquid crystal layer 17, the pretilt angle can further be adjusted by performing a second ultraviolet ray irradiation with a voltage equal to or greater than the threshold value applied to the liquid crystal layer 17. Specifically, as shown in FIG. 4C, while applying a voltage to the liquid crystal layer 17 in regions R1 and R2 using each pixel electrode 14 and the common electrode 13, the liquid crystal layer 17 is irradiated with ultraviolet rays over the entire regions R1 and R2.

Figure 4D:
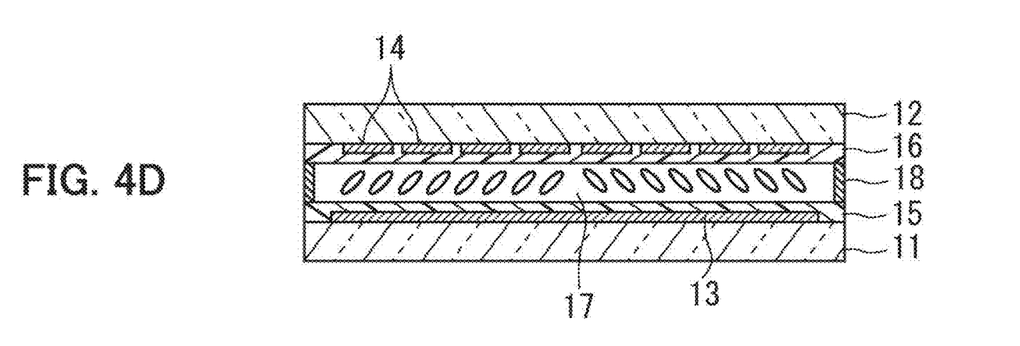

As a result, as shown in FIG. 4D, in region R1, while maintaining the alignment direction of the liquid crystal layer 17 obtained by the first ultraviolet ray irradiation, depending on the magnitude of the applied voltage, it is possible to control the magnitude of the pretilt angle of the liquid crystal layer 17 in region R1 of the liquid crystal element 1 obtained after the ultraviolet ray irradiation.

Further, while maintaining the alignment direction of the liquid crystal layer 17 obtained by each of the alignment films 15 and 16 in region R2, depending on the magnitude of the applied voltage, it is possible to control the magnitude of the pretilt angle of the liquid crystal layer 17 in region R2 of the liquid crystal element 1 obtained after the ultraviolet ray irradiation.

Here, in this embodiment, the RM agent added to the liquid crystal material which satisfies the conditions as described below is used. As a result, in the liquid crystal element 1 obtained through the manufacturing method as described above, it is possible to provide regions R1 and R2 having different pretilt angles from each other.

Figure 5:
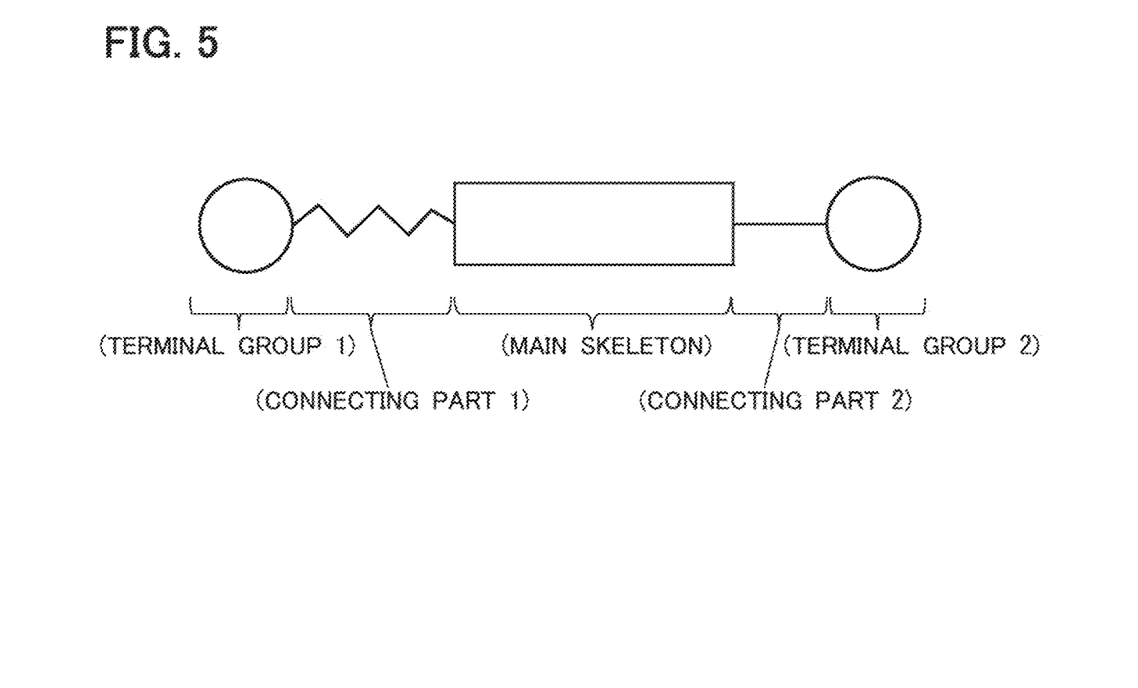
FIG. 5 is a diagram showing a structural model of a RM agent.

After studying various types of RM agent, the inventors of the present application have found suitable conditions for the RM agent which can easily obtain different pretilt angles in regions R1 and R2. Its characteristic features will be described below with reference to a structural model shown in FIG. 5. Further, examples of the suitable RM agent having the below-described characteristics include;

2-Propenoic acid, 2-methyl-, 2'-fluoro-4"-[3-[(2-methyl-1-oxo-2-propen-1-yl)oxy]propyl][1,1': 4',1"-terphenyl]-4-yl ester (CAS Registry Number: 1299463-48-1);

2-Propenoic acid, 2-methyl-, 4"-[3-[(2-methyl-1-oxo-2-propen-1-yl)oxy]propyl][1,1': 4',1"-terphenyl]-4-yl ester;

2-Propenoic acid, 3-[4'-[(1-oxo-2-propen-1-yl)oxy][1,1'-biphenyl]-4-yl]propyl ester (CAS Registry Number: 1422344-81-7);

2-Propenoic acid, 3-[7-[(1-oxo-2-propen-1-yl)oxy]-2-phenanthrenyl]propyl ester (CAS Registry Number: 1422344-87-3); and 2-Propenoic acid, 1,1'-(2'-fluoro [1,1': 4',1"-terphenyl]-4,4"-diyl) ester (CAS Registry Number: 1422344-90-8).

(Characteristic Feature 1)

At least one of terminal groups 1 and 2 is a photopolymerizable site such as acrylate or methacrylate. The other terminal group may be an alkyl group such as a methyl group, but it is more preferable that both sides of the terminal group are photopolymerizable sites. Here, note that an RM agent including a photopolymerizable site on only one terminal group and an RM agent including photopolymerizable sites on both sides of the terminal group may be used in combination.

(Characteristic Feature 2)

At least one of connecting parts 1 and 2 which is a site connecting the main skeleton and each of the terminal groups 1 and 2 is a flexible site such as an alkyl chain. That is, in a molecular formula CxH2x, at least one of the connecting parts is preferably an alkyl chain in which x is 3 or more, more preferably 3 or more and 5 or less. Furthermore, if x of the terminal group on one side (for example, connecting part 1) is 3 or more, then on the other side (for example, connecting part 2), the main skeleton and the terminal group may be directly connected (i.e., connecting part 2 is not necessary).

(Characteristic Feature 3)

The main skeleton has a two or more rings (more preferably, three or more rings). Furthermore, some of the hydrogen may be substituted with fluorine or the like, or a fluorine substituent or the like may be introduced. The main skeleton is more preferably a benzene ring having two or more rings (more preferably three or more rings). Further, it is preferable that a fluorine group or the like is attached to a part of the benzene ring. Specifically, a phenanthrene structure and a structure in which a part of hydrogen is substituted with fluorine or the like, a terphenyl structure, a terphenyls structure (having two or more benzene rings), and a structure in which a part of hydrogen is substituted with fluorine or the like are preferred.

Figure 6A:
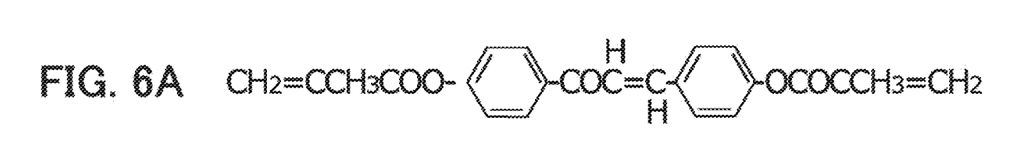
FIGS. 6A to 6C are diagrams showing chemical formulas of examples of unsuitable RM agent.
Figure 6B:
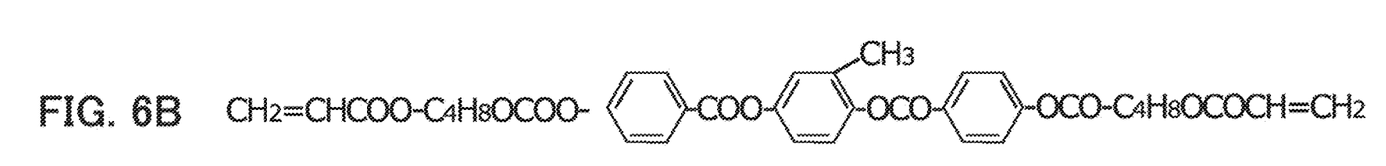
Figure 6C:
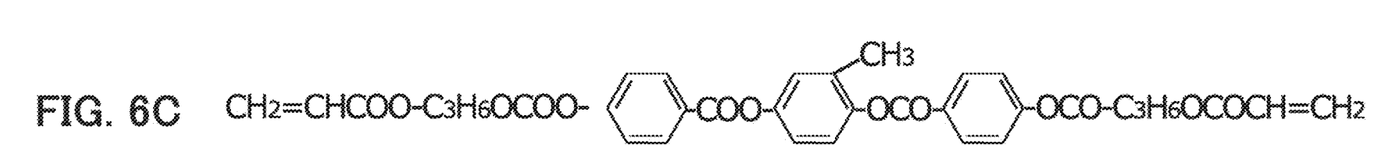

On the contrary, as described below, the inventors of the present application have found conditions for the RM agent under which different pretilt angles cannot be obtained in region R1 and region R2. The chemical formulas of examples of the RM agent which meet the following unsuitable conditions are shown in FIGS. 6A to 6C.

(Characteristic Feature 1)

A symmetrical molecular structure exists.

(Characteristic Feature 2)

No flexible sites exists.

(Characteristic Feature 3)

Even if a flexible site were to exist, the three ring part (the site of a cyclic compound containing three connected rings) is also a flexible site, and there is no rigid site.

(Characteristic Feature 4)

No fluorine group exists in the ring part (methyl group is present).

(Characteristic Feature 5)

There is a tendency to become a dense polymer.

By manufacturing the liquid crystal element 1 using the RM agent under the suitable conditions described above, a pretilt angle occurs in the direction opposite to the alignment processing direction (direction of alignment regulating force) in region R1 which is irradiated with ultraviolet rays. And in region R2 which is not irradiated with ultraviolet rays, a pretilt angle occurs in the same direction as the alignment processing direction (direction of alignment regulating force). Therefore, a two-domain alignment can be easily obtained without going through a complicated manufacturing process. That is, depending on the presence or absence of an ultraviolet ray irradiation, it is possible to obtain a reverse pretilt state in region R1 which is approximately half of the region of liquid crystal element 1 in a plan view, and a forward pretilt state in region R2 which is approximately the remaining half of the region of the liquid crystal element.

Figure 7:
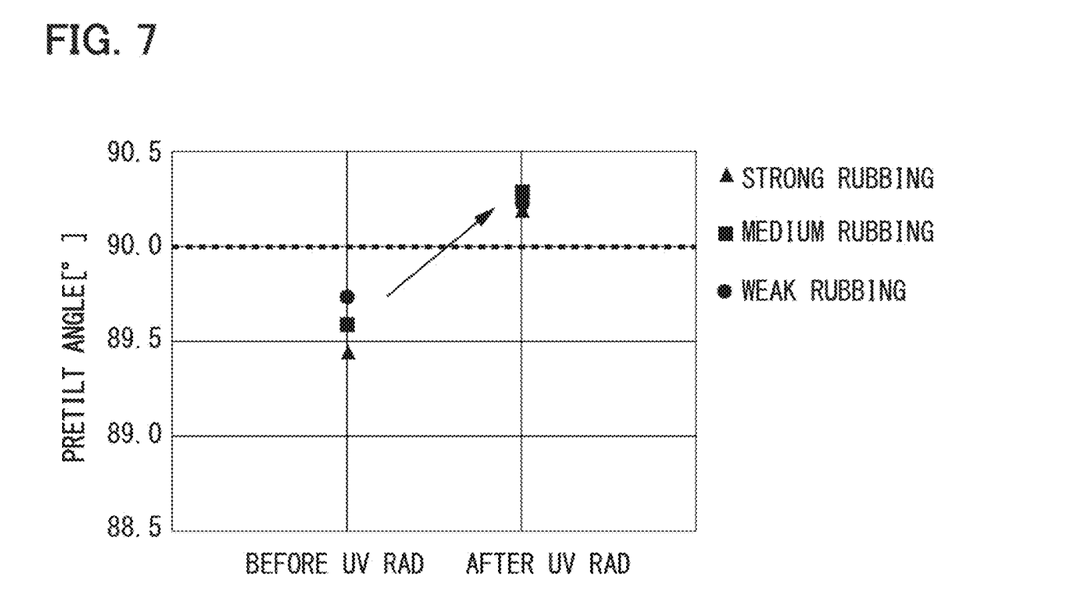
FIG. 7 is a diagram showing evaluation results regarding the dependence of the pretilt angle on the rubbing strength applied to the alignment film in region R1 where a reverse pretilt can be obtained.

FIG. 7 is a diagram showing evaluation results regarding the dependence of the pretilt angle on the rubbing strength applied to the alignment film in region R1 where a reverse pretilt can be obtained. Here, a siloxane-based inorganic alignment film is used as the alignment film. Samples of the liquid crystal element 1 were manufactured so that rubbing strength applied to the alignment film was set in three different levels and pretilt angles were measured for each sample. With regard to the rubbing strength, mainly, the amount of push-in has been changed. Specifically, three levels of rubbing strength were set: "medium rubbing" which has a general strength, "strong rubbing" which has more push-in amount than that of the "medium rubbing", and "weak rubbing" which has less push-in amount than that of the "medium rubbing".

As shown in the figure, the pretilt angles before ultraviolet (UV) ray irradiation in region R1 has dependence on the rubbing strength, and the weaker the rubbing strength, the closer the pretilt angle is to 90°. On the other hand, the pretilt angles after ultraviolet ray irradiation is within 90.2° to 90.3° regardless of the pretilt angle before the irradiation. Therefore, it can be said that the pretilt angle after ultraviolet ray irradiation in region R1 hardly depends on the rubbing conditions, so that the margin regarding the rubbing conditions during manufacturing of the liquid crystal element 1 can be widened.

Figure 8:
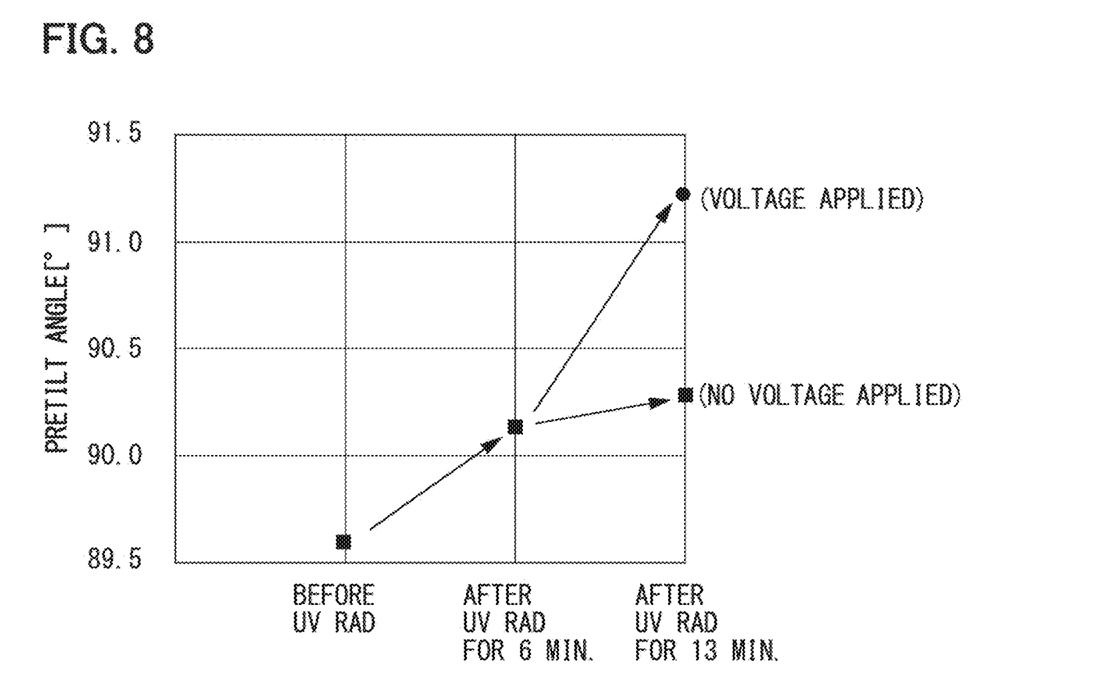
FIG. 8 is a diagram showing evaluation results regarding changes in pretilt angle due to voltage application to the liquid crystal layer in region R1 where a reverse pretilt can be obtained.

FIG. 8 is a diagram showing evaluation results regarding changes in pretilt angles due to voltage application to the liquid crystal layer in region R1 where a reverse pretilt can be obtained. Here, a sample of the liquid crystal element 1 manufactured under the condition of "medium rubbing" of the above-described rubbing strength applied to the alignment film is used. As shown in the figure, the pretilt angle was approximately 89.6° before the ultraviolet ray irradiation. Then, as the first ultraviolet irradiation, the liquid crystal layer 17 was irradiated with ultraviolet rays for 6 minutes with no voltage applied (or a voltage below a threshold value being applied), thereby reversing the alignment direction of the liquid crystal layer 17 and setting the pretilt angle to approximately 90.2°. Then, as the second ultraviolet irradiation, ultraviolet ray irradiation was performed for 7 minutes, and at this time, when a voltage of 20V was applied to the liquid crystal layer 17, the pretilt angle became approximately 91.25°, and when no voltage was applied (or a voltage below the threshold value was applied), the pretilt angle became approximately 90.3°.

In other words, as described above, it was shown that the pretilt angle can be controlled by performing ultraviolet ray irradiation in two stages and applying a voltage to the liquid crystal layer 17 in the second stage. Here, note that, as in this example, the first ultraviolet ray irradiation and the second ultraviolet ray irradiation may be performed consecutively, or there may be a time interval between the first and second irradiation.

Here, note that if a voltage is applied to the liquid crystal layer 17 from the time of the initial ultraviolet ray irradiation, the alignment direction of the liquid crystal layer 17 will not be reversed, and the magnitude of the pretilt angle can be controlled by the alignment direction determined by the alignment films 15 and 16. Specifically, the pretilt angle can be made smaller as the voltage applied during the ultraviolet ray irradiation is being increased.

Furthermore, if a mask with two or more divisions is used as mask M during manufacturing, it is possible to achieve an alignment in which the pretilt angles differ depending on the region within the liquid crystal element (alignment directions are in two directions). By obtaining different pretilt angles depending on the region, the threshold value of the voltage of each region becomes different, thereby it is possible to realize gradation display and further improve viewing angle characteristics.

Figure 9:
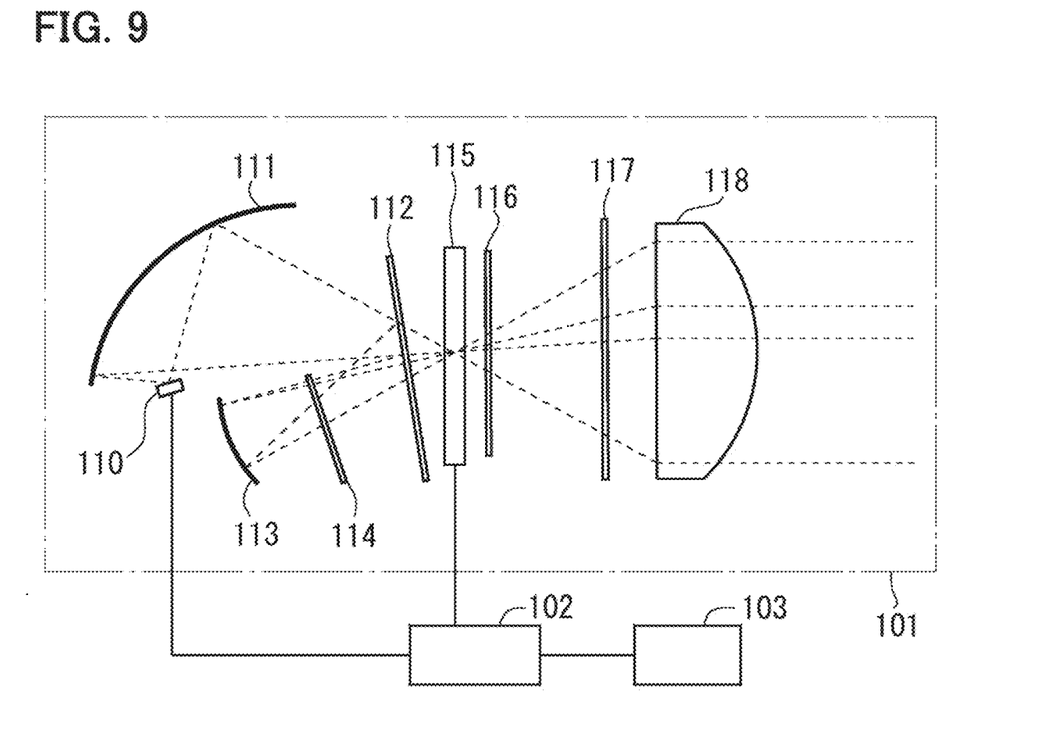
FIG. 9 is a diagram showing the configuration of a vehicle lamp system according to one embodiment.

FIG. 9 is a diagram showing the configuration of a vehicle lamp system according to one embodiment. The vehicle lamp system shown in FIG. 9 is configured using a liquid crystal element having the same configuration as the liquid crystal element 1 according to the above described embodiment, and is configured to include a vehicle lamp (a lighting apparatus) 101, a controller 102, and a camera 103. This vehicle lamp system detects positions of vehicles in front, faces of pedestrians, etc. around the own vehicle based on images taken by the camera 103, sets a certain region including the position of the vehicles in front as a non-irradiation region (a dimming region), and sets the region other than the certain area as a light irradiation region and selectively irradiates light, and further irradiates light in various shapes onto the road surface.

The vehicle lamp 101 is arranged at a predetermined position at the front of the vehicle, and forms irradiation light for irradiating the front of the vehicle. Here, note that, for example, although one vehicle lamp 101 is provided on each of the left and right sides of the front portion of the vehicle, only one lamp is illustrated here.

The controller 102 controls the operation of a light source 110 and a liquid crystal element 115 of the vehicle lamp 101. This controller 102 is realized by using a computer system having, for example, a CPU (Central Processing Unit), a ROM (Read Only Memory), a RAM (Random Access Memory), etc., and by executing a predetermined operating program in the computer system. The controller 102 of this embodiment turns on the light source 110 according to the operating state of a light switch (not shown) installed near the driver's seat, sets a light distribution pattern according to objects such as a forward vehicle (oncoming vehicle, preceding vehicle), a pedestrian, a road sign, a white line on the road, or the like detected by the camera 103, and provides a control signal to the liquid crystal element 115 for forming an image corresponding to this light distribution pattern.

The camera 103 photographs the space in front of the own vehicle to generate an image and performs predetermined image recognition processing on this image to detect the position, range, size, type, etc. of the object such as the forward vehicle. The detection result obtained by the image recognition processing is provided to the controller 102 which is connected to the camera 103. The camera 103 is installed at a predetermined position inside the vehicle (for example, upper portion of the windshield) or at a predetermined position outside the vehicle (for example, inside the front bumper). If the vehicle is equipped with a camera for other purposes (for example, an automatic braking system, etc.), the camera may be shared.

Here, note that the function of image recognition processing of the camera 103 may be replaced by the controller 102. In this case, the camera 103 outputs the generated image to the controller 102, and image recognition processing is performed on the controller 102 side based on this image. Alternatively, both the image and the result of image recognition processing based on the image may be provided from the camera 103 to the controller 102. In this case, the controller 102 may further perform its own image recognition processing using the image obtained from the camera 103.

The vehicle lamp 101 shown in FIG. 9 is configured to further include the light source 110, reflectors 111 and 113, a polarizing beam splitter 112, a quarter-wave plate 114, the liquid crystal element 115, an optical compensator 116, a polarizer 117, and a projection lens 118. Each of these elements is housed and integrated in one housing, for example. Further, the light source 110 and the liquid crystal element 115 are each connected to the controller 102.

The light source 110 emits light under the control of the controller 102. The light source 110 is configured to include several light emitting elements such as white LEDs (Light Emitting Diodes) and a drive circuit, for example. Here, note that the configuration of the light source 110 is not limited thereto. For example, the light source 110 can be a laser element, or a light source commonly used in a vehicle lamp such as a light bulb or a discharge lamp.

The reflector 111 is arranged in correspondence with the light source 110, reflects and condenses light emitted from the light source 110, guides it toward the polarizing beam splitter 112, and causes the light to enter the liquid crystal element 115. The reflector 111 is a reflecting mirror having an ellipsoidal reflecting surface, for example. In this case, the light source 110 can be placed near the focal point of the reflective surface of the reflector 111. Here, note that instead of the reflector 111, a condensing lens may be used as an optical member for condensing the light.

The polarizing beam splitter 112 is a reflective polarizing element that transmits a polarized component in a specific direction of the incident light and reflects a polarized component in a direction perpendicular to the specific direction. As such a polarizing beam splitter 112, for example, a wire grid type polarizing element, a multilayer film polarizing element, or the like can be used.

The reflector 113 is provided at a position where the light reflected by the polarizing beam splitter 112 can be incident, and reflects the incident light toward the direction of the polarizing beam splitter 112.

The quarter-wave plate 114 is placed on the optical path between the polarizing beam splitter 112 and the reflector 113, and provides a phase difference to the incident light. In this embodiment, the light reflected by the polarizing beam splitter 112 passes through the quarter-wave plate 114, is reflected by the reflector 113, and passes through the quarter-wave plate 114 again, thereby the polarization direction is rotated by 90 degrees and the light enters the polarization beam splitter 112 again. As a result, the re-entering light can pass through the polarizing beam splitter 112, thereby the light utilization efficiency is improved.

The liquid crystal element 115 is arranged at a position where the light reflected and condensed by each of the reflectors 111 and 113 can enter. The liquid crystal element 115 includes a plurality of pixel portions (light modulation portions) which can be controlled independently of each other. In this embodiment, the liquid crystal element 115 includes a driver (not shown) for applying a driving voltage to each pixel portion. The driver applies a driving voltage to the liquid crystal element 115 to individually drive each pixel portion based on a control signal provided from the controller 102. This liquid crystal element 115 has the same configuration as that of the liquid crystal element 1 of the embodiment described above.

The optical compensator 116 is for compensating the phase difference of the light transmitted through the liquid crystal element 115 and for increasing the degree of polarization. Here, note that the optical compensator 116 may be omitted.

The polarizer 117 is arranged on the light emitting side of the liquid crystal element 115. The polarizing beam splitter 112, the polarizer 117, and the liquid crystal element 115 disposed therebetween form an image corresponding to a light distribution pattern of the light irradiated to the front of the own vehicle.

The projection lens 118 is arranged at a position where the light reflected and condensed by the reflectors 111 and 113 and transmitted through the liquid crystal element 115, the optical compensator 116, and the polarizer 117 can enter, and projects this incident light to the front of the own vehicle. The projection lens 118 is arranged so that its focal point corresponds to the position of the liquid crystal layer of the liquid crystal element 115.

Figure 10A:
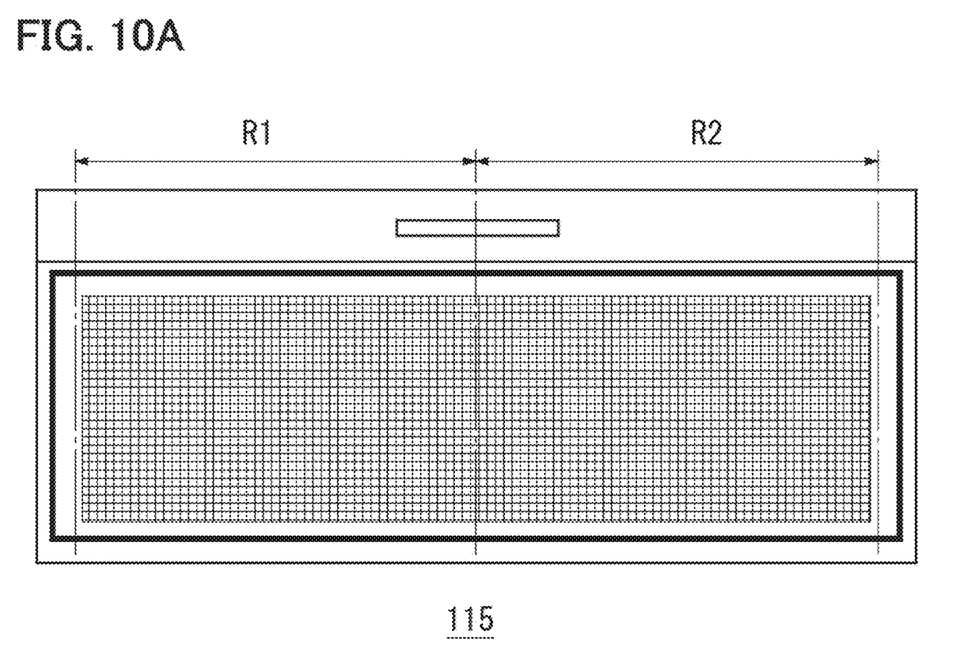
FIG. 10A is a schematic plan view showing a configuration example of pixel portions of a liquid crystal element in a vehicle lamp system.
Figure 10B:
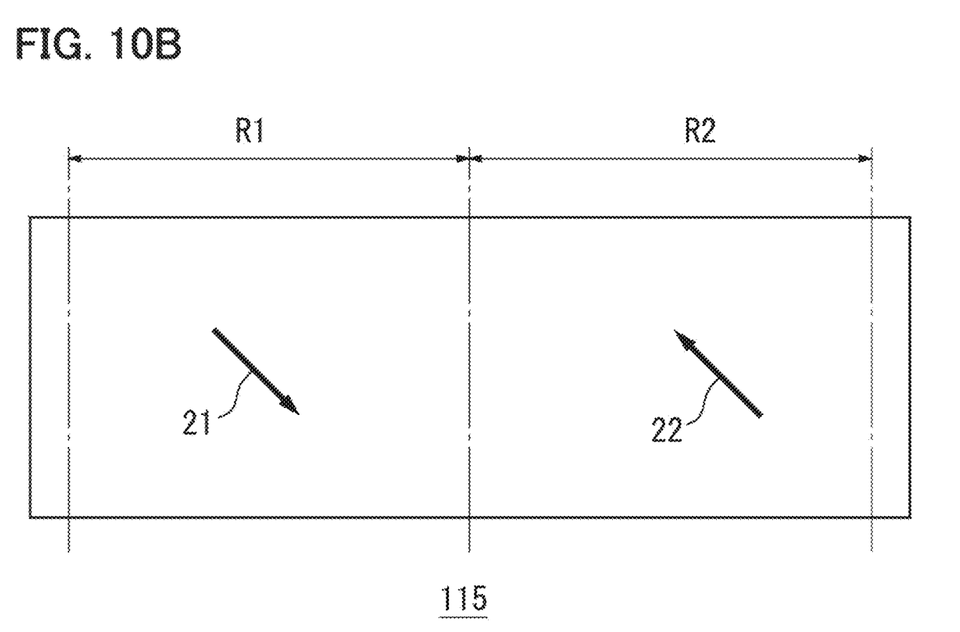
FIG. 10B is a schematic plan view for explaining viewing directions in a liquid crystal element.

FIG. 10A is a schematic plan view showing a configuration example of pixel portions of a liquid crystal element in a vehicle lamp system. Further, FIG. 10B is a schematic plan view for explaining the viewing directions in this liquid crystal element. As shown in FIG. 10A, in the liquid crystal element 115, a pixel portion group including a plurality of pixel portions is provided in region R1 and region R2, respectively.

As shown in FIG. 10B, viewing direction 21 of region R1 is a direction toward the lower right in the figure, and forms an angle of approximately 45° with respect to the left-right direction in the figure. Further, viewing direction 22 of region R2 is a direction toward the upper left in the figure, and forms an angle of approximately 45° with respect to the left-right direction in the figure. In this way, the viewing directions in regions R1 and R2 are anti-parallel, and the liquid crystal layer has a two-domain alignment corresponding to regions R1 and R2.

Figure 11A:
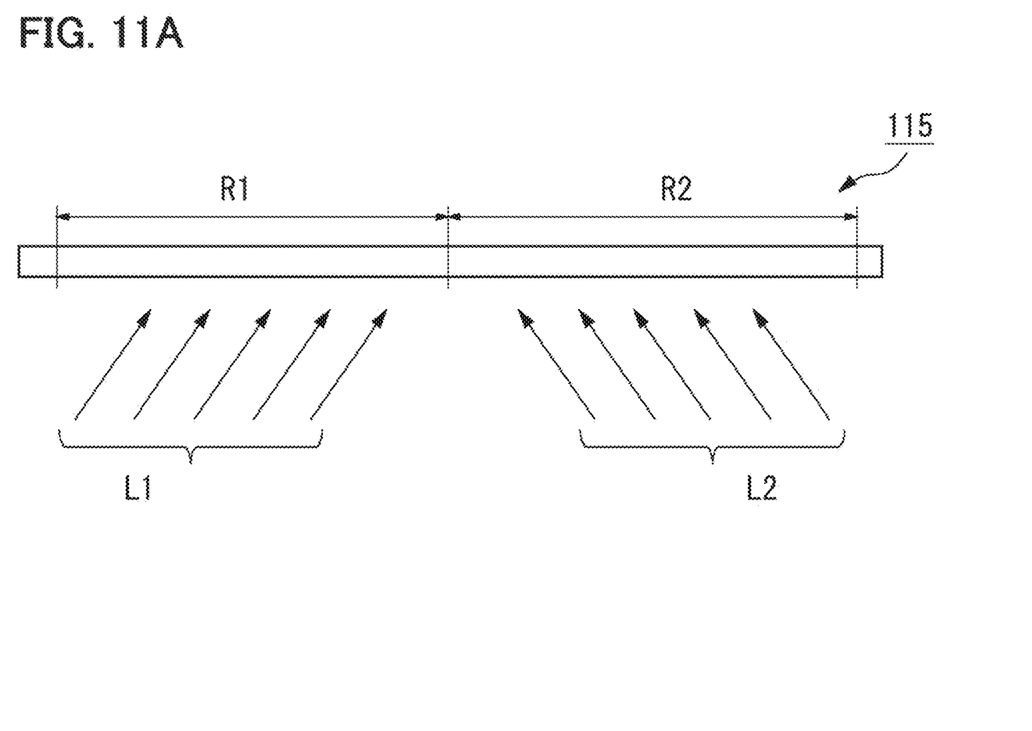
FIG. 11A is a diagram schematically showing directions of incidence of light onto a liquid crystal element.

FIG. 11A is a diagram schematically showing the directions of incidence of light to the liquid crystal element 115. FIG. 11A schematically shows how the liquid crystal element 115 is viewed from its upper end side. As shown in FIG. 11A, in the vehicle lamp system of this embodiment, light emitted from the light source 110 and condensed by the reflectors 111 and 113 enters the liquid crystal element 115 from an oblique direction at a wide angle. Specifically, light L1 which enters region R1 of the liquid crystal element 115 is mainly the light that travels diagonally to the upper-right in the figure, and on the other hand, light L2 which enters region R2 of the liquid crystal element 115 is mainly the light that travels diagonally to the upper-left in the figure.

Here, if regions R1 and R2 were to both have the same viewing direction, the brightness of the projected image would be uneven. The reason for this is as described above with reference to FIG. 2, and is because a difference in transmittance occurs between the viewing direction and the reverse viewing direction. On the contrary, in this embodiment, since the viewing directions are opposite in each of regions R1 and R2, it is possible to reduce uneven brightness of the projected image.

Figure 11B:
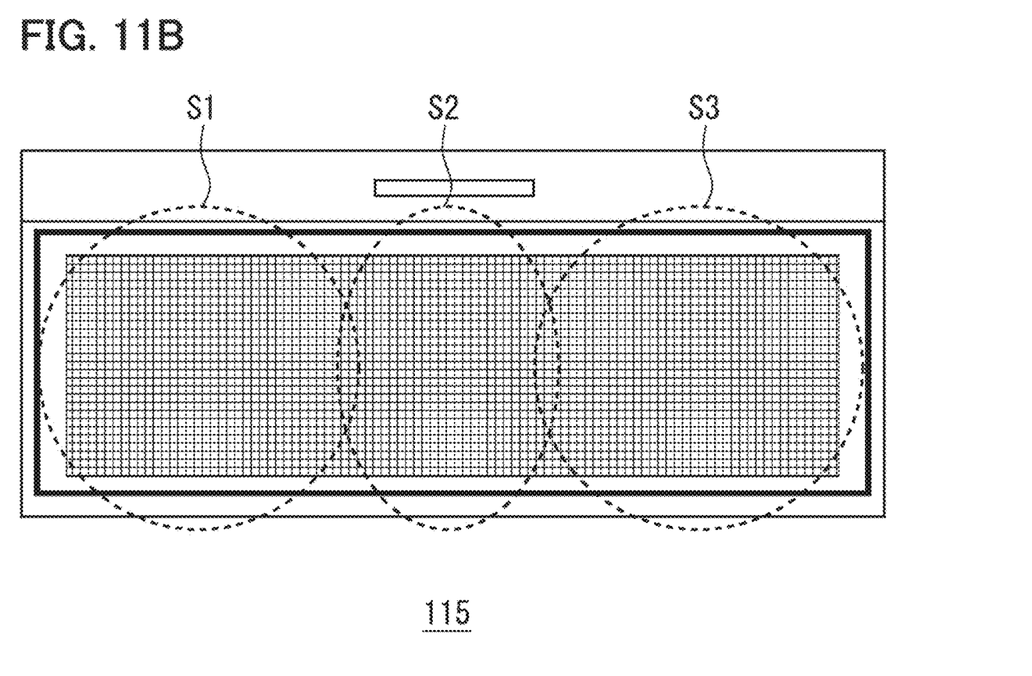
FIG. 11B is a schematic plan view for explaining the range of light incidence onto the liquid crystal element.

FIG. 11B is a schematic plan view for explaining the range of light incidence on the liquid crystal element 115. As shown in FIG. 11B, portions where the pixel portions are arranged in the liquid crystal element 115 are roughly divided into three regions S1, S2, and S3. The central region S2 corresponds to the central portion of the entire pixel portion group, and is a region where light is collected from various directions in order to obtain maximum luminous intensity. To this region S2, when averaged over the entire region, light enters equally on the left and right sides.

On the other hand, the left and right regions S1 and S3 in the figure correspond to the left side and right side of the entire pixel portions, and as described above, these are regions where polarized light from the left or right direction enters, respectively. Although the degree and direction of polarization of the light depends on the configuration of the optical system, it is generally difficult to make the light incident equally on the left and right sides. In other words, it can be said that the preferred viewing direction is different between region S1 and region S3.

Therefore, in this embodiment, the alignment directions of the liquid crystal layer are made to be different between a region which is a combination of region S1 and the left half of region S2 in the figure (corresponding to region R1), and a region which is a combination of region S3 and the right half of region S2 in the figure (corresponding to region R2). That is, the liquid crystal element 115 is configured so that the region which combines region S1 and the left half of region S2 in the figure becomes the above-described region R1, and the region which combines region S3 and the right half of region S2 in the figure becomes the above-described region R2. As a result, a two-domain alignment with different viewing directions in each region is realized, and unevenness in the brightness of the transmitted light can be reduced in all regions S1 to S3.

Here, note that, as a specific method for realizing two-domain alignment, the above-described method or a combination thereof can be used. That is, either of the following two methods may be used.

(a) A method of selectively irradiating region R1 with ultraviolet rays while applying no voltage (or applying a voltage below a threshold value) to both regions R1 and R2.

(b) After the above (a), a method of further irradiating the entire regions R1 and R2 with ultraviolet rays while applying a voltage equal to or greater than the threshold value to both regions R1 and R2.

According to the above-described embodiments, a liquid crystal element that can obtain a plurality of alignment domains with a simple configuration is provided. Further, by using the liquid crystal element, it is possible to obtain a vehicle lamp and a vehicle lamp system with reduced uneven brightness of its projected image.

Here, note that the present disclosure is not limited to the content of the embodiments described above, and can be implemented with various modifications within the scope of the gist of the present disclosure.

Further, in the above-described embodiment, a vehicle lamp is cited as an example of a lighting apparatus to which the liquid crystal element according to the present disclosure can be applied, and a vehicle lamp system is further cited as an example of a system to which the vehicle lamp according to the present disclosure is applied. However, the scope of application of the liquid crystal element is not limited thereto, and the liquid crystal element of the present disclosure can be applied to various lighting apparatus or systems.

The present application is based on, and claims priority from, JP Application Serial Number 2023-80006 filed on May 15, 2023, the disclosure of which is hereby incorporated by reference herein in its entirety.

DESCRIPTION OF SYMBOLS

11: First substrate
12: Second substrate
13: Common electrode
14: Pixel electrode 15, 16: Alignment film
17: Liquid crystal layer
18: Seal material
18a: Injection port
19: End seal material
21, 22: Viewing direction
R1, R2: Region

What is claimed is:

1. A manufacturing method of a liquid crystal element comprising:
performing a first process of forming a first substrate having a first alignment film subjected to a first uniaxial alignment treatment;
performing a second process of forming a second substrate having a second alignment film subjected to a second uniaxial alignment treatment;
performing a third process of forming a liquid crystal layer between the first alignment film and the second alignment film using a liquid crystal material including a monomer which can be polymerized by light irradiation; and
performing a fourth process of irradiating light on, from among a first region and a second region adjacent to each other in the liquid crystal layer in a plan view, the first region with no voltage applied or with a voltage less than a threshold value applied to the first region,
wherein the liquid crystal layer of the liquid crystal element exhibits a pretilt angle in a direction opposite to a direction determined by the first alignment film and the second alignment film in the first region, and exhibits a pretilt angle in a same direction as the direction determined by the first alignment film and the second alignment film in the second region.

2. The manufacturing method according to claim 1, further comprising performing, after the fourth process, a fifth process of irradiating the first region and the second region with light while applying a voltage equal to or greater than the threshold value to each of the first region and the second region of the liquid crystal layer.

3. The manufacturing method according to claim 1, wherein the third process includes dropping the liquid crystal material on the first alignment film or the second alignment film and then bonding the first substrate and the second substrate together so that the first alignment film and the second alignment film face each other.

4. The manufacturing method according to claim 1, wherein the third process includes bonding the first substrate and the second substrate together so that the first alignment film and the second alignment film face each other, and then vacuum injecting the liquid crystal material between the first alignment film and the second alignment film.

5. The manufacturing method according to claim 1, wherein a polymerized part of the monomer is an acrylate or a methacrylate, and the monomer has a flexible site at least on one side between a ring part and a terminal group.

6. The manufacturing method according to claim 5, wherein a ring part of the monomer has a fluorine group.

7. The manufacturing method according to claim 5, wherein a ring part of the monomer has two or more rings.

8. The manufacturing method according to claim 1, wherein the first alignment film and the second alignment film are siloxane-based vertical alignment films.

9. The liquid crystal element manufactured by the manufacturing method according to claim 1.

10. A lighting apparatus comprising:
the liquid crystal element according to claim 9;
a light source;
an optical member that condenses a light emitted from the light source and causes the light to enter the liquid crystal element; and
a pair of polarizers arranged opposite each other with the liquid crystal element therebetween.

11. The lighting apparatus according to claim 10, wherein the light incident on each of the first region and the second region of the liquid crystal element is incident from different directions.

12. The manufacturing method according to claim 1, wherein the first uniaxial alignment treatment in the first process and the second uniaxial alignment treatment in the second process are each a rubbing treatment.

13. A manufacturing method of a liquid crystal element comprising:
performing a first process of forming a first substrate having a first alignment film subjected to a first uniaxial alignment treatment;
performing a second process of forming a second substrate having a second alignment film subjected to a second uniaxial alignment treatment;
performing a third process of forming a liquid crystal layer between the first alignment film and the second alignment film using a liquid crystal material including a monomer which can be polymerized by light irradiation; and
performing a fourth process of irradiating light on, from among a first region and a second region adjacent to each other in the liquid crystal layer in a plan view, the first region with no voltage applied or with a voltage less than a threshold value applied to the first region,
wherein a concentration of the monomer in the liquid crystal material is equal to 0.3 wt % or greater.

14. The liquid crystal element manufactured by the manufacturing method according to claim 13.

15. A liquid crystal element comprising:
a first substrate and a second substrate arranged to face each other;
a first alignment film disposed on a side of the first substrate facing the second substrate;
a second alignment film disposed on a side of the second substrate facing the first substrate;
a liquid crystal layer disposed between the first substrate and the second substrate; and
a seal material disposed between the first substrate and the second substrate surrounding the liquid crystal layer, and which has an injection port formed by partially opening the seal material;
wherein the first alignment film and second alignment film are each subjected to a uniaxial alignment treatment, and each has an alignment regulating force in one direction on a surface in contact with the liquid crystal layer,
wherein, at each of an interface between the first alignment film and the liquid crystal layer and an interface between the second alignment film and the liquid crystal layer, a monomer polymerizable by light irradiation or a polymer obtained by polymerizing the monomer is present,
wherein the liquid crystal layer has a first region and a second region in a plan view, and
wherein the first region has a pretilt angle in a direction opposite to the direction of the alignment regulating force, and the second region has a pretilt angle in the same direction as the direction of the alignment regulating force.

16. The liquid crystal element according to claim 15, wherein, in the first region and the second region, the first alignment film and the second alignment film are each continuously formed, and the alignment regulating force of the two films are in the same direction.

17. The liquid crystal element according to claim 15, wherein a concentration of the monomer in the liquid crystal layer is equal to 0.3 wt % or greater.

\* \* \* \* \*